Aug. 6, 1935.  W. B. SCOTT  2,010,736

SAFETY AUTOMOBILE DOORLOCK

Filed Sept. 5, 1934   2 Sheets-Sheet 1

Inventor
*W. B. Scott*

By *Geo. P. Kimmel*
Attorney

Aug. 6, 1935.  W. B. SCOTT  2,010,736
SAFETY AUTOMOBILE DOORLOCK
Filed Sept. 5, 1934  2 Sheets-Sheet 2

Inventor
W. B. Scott
By Geo. P. Kimmel
Attorney

Patented Aug. 6, 1935

2,010,736

UNITED STATES PATENT OFFICE 2,010,736

SAFETY AUTOMOBILE DOORLOCK

Walter B. Scott, Hoisington, Kans.

Application September 5, 1934, Serial No. 742,830

10 Claims. (Cl. 180—82)

My present invention relates generally to motor cars and more particularly to those cars having side doors which are hinged at their rear edges to the door frames to swing outwardly and rearwardly in opening. Such doors present forward free edges and are ordinarily dangerous in certain instances in travel, since if they are partially opened by an occupant of the car the forceful pull of the air currents tend to fully open the doors so suddenly as to place anyone grasping the same in danger of being jerked out of the car.

Accidents of the above nature have happened in the past and are usually of a serious nature since when they do happen the car is under considerable speed, and they will continue to happen unless some means are provided which will insure that the doors are in fully closed positions before the car is in movement, and cannot thereafter be opened while the car is in normal running.

I propose to accomplish the above by simple inexpensive connections which may be installed in cars already in use with very nearly as little difficulty as during manufacture of the car, which will be durable and uniformly effective in use, and which will be unfailing in action.

Figure 1:
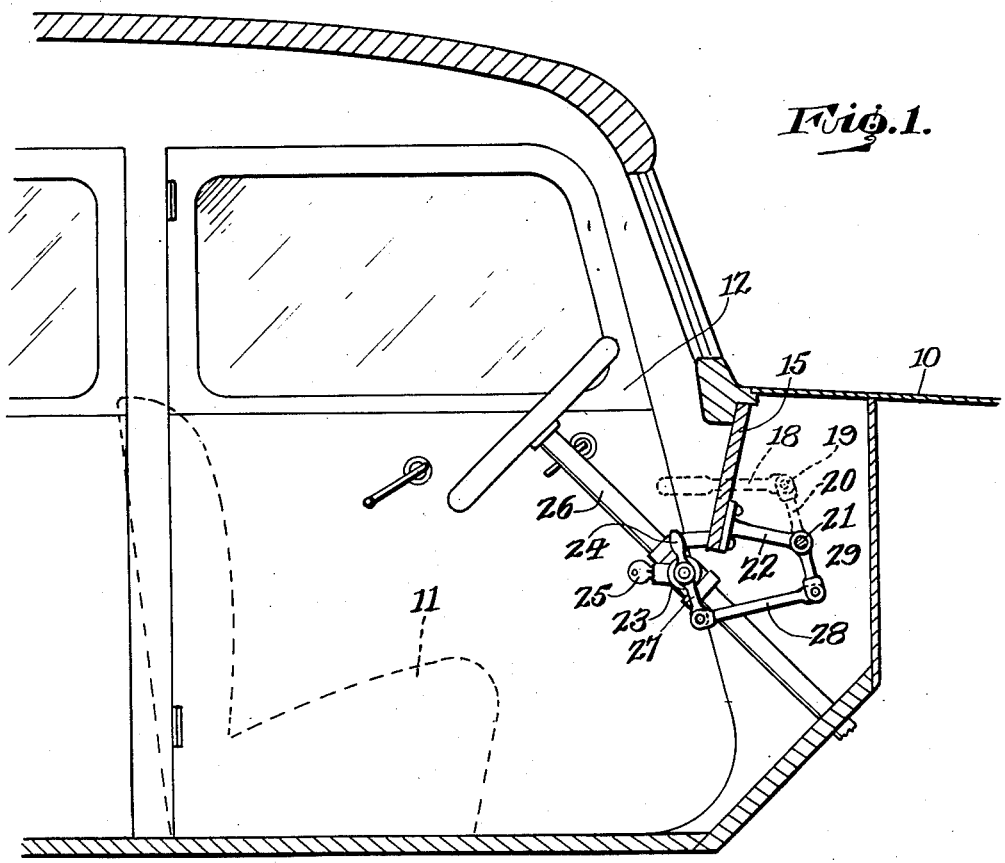
Figure 2:
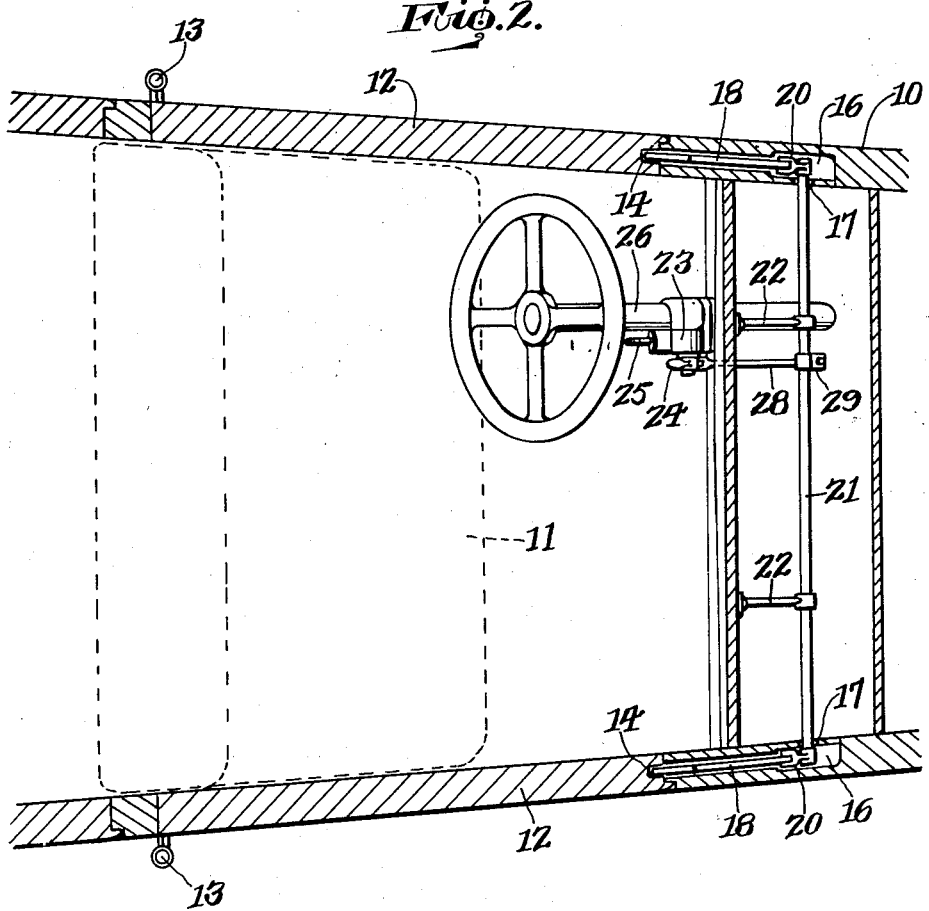
Figure 3:
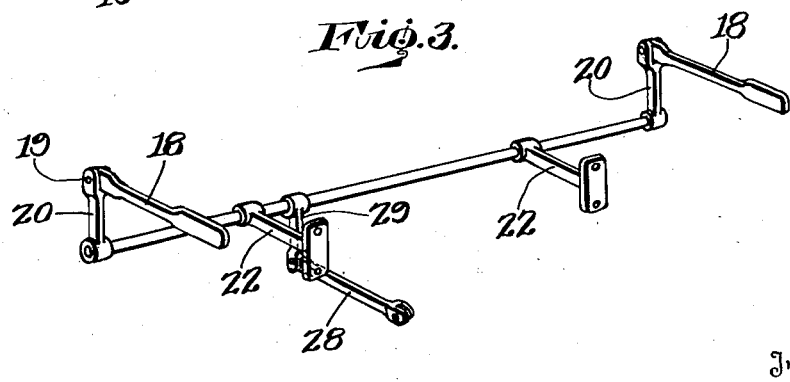

In the accompanying drawings, illustrating my invention and forming a part of this specification, Figure 1 is a partial vertical longitudinal section through a motor car illustrating the practical application of my invention, Figure 2 is a horizontal section taken through the parts shown in Figure 1, and Figure 3 is a detail perspective view showing the connections constituting the major portion of my invention.

Referring now to the above figures, I have shown in Figures 1 and 2, a motor car generally indicated at 10, having an operator's seat 11 and doors 12 at opposite sides of the operator's seat hinged at their rear edges at 13 so that in opening the doors they swing outwardly and rearwardly. The forward free edges of these doors are in accordance with my invention, provided with shallow bolt sockets 14 located some distance above the lower edges of the doors and preferably in about the horizontal plane of the instrument panel 15.

The above mentioned sockets 14 of the doors are also formed so that when the doors are fully closed, they are in alignment with forwardly extending horizontal channels 16 formed in the frame and in communication at their forward ends with lateral openings 17 in the car frame forwardly of, and concealed beneath, the instrument panel 15.

Within the channels 16 are lengthwise and horizontally movable locking bolts 18 whose rear free ends are formed to snugly interfit the sockets 14 and whose forward ends are pivoted at 19 to the upper ends of a pair of crank arms 20 rigidly upstanding from the opposite ends of a shaft 21.

As best seen in Figure 2, the shaft 21 extends across the interior of the car 10 forwardly of and parallel with the instrument panel 15 and is mounted to freely rotate in a pair of bearing brackets 22 securely fastened to said panel, both the brackets 22 and shaft 21 being thus concealed from normal view.

In Figures 1 and 2 I have also shown the motor car 10 as embodying an ignition switch 23 operated by a short upstanding arm 24 which is shifted rearwardly toward the operator on seat 11 to "on" position, closing the motor ignition circuit, and is shifted forwardly to the "off" position, breaking the ignition circuit. Movement of this is normally controlled by a key 25 and in the present instance I have shown the switch mounted at one side of the steering post 26 adjacent to the lower edge of the instrument panel 15.

According to my invention, the switch throwing arm 24 has a lever extension 27 below the switch 23, pivotally connected at its lower free end with the adjacent rear end of a link 28 similarly pivoted at its forward end with the lower end of a crank arm 29 rigid with the shaft 21 and depending therefrom at a point intermediate its ends and alined lengthwise of the car with respect to the switch lever 27.

It is thus obvious that when the switch arm 24 is moved rearwardly to close the ignition circuit, its pendant lever 27 will, through link 28 and crank arm 29, rotate shaft 21 counter clockwise, thus shifting the locking bolts 18 rearwardly into the door sockets 14 provided, however, the doors are fully closed. Should the doors be only partially closed, the ends of the bolts 18 will strike the door edges and will prevent full effective movement of the switch arm 24 to permit the starting of the motor.

When the doors have been fully closed and the motor is started, it is likewise obvious the doors cannot be opened since the locking bolts 18 remain in the door sockets 14 until the motor is stopped by shifting the switch arm 24 forwardly, to break or open the motor circuit, from the locked position shown in Figures 1 and 2, when the bolts 18 are shifted forwardly to released position through clockwise rotation of the shaft 21.

It is plain therefore that at little additional cost, the danger of accidental opening of the doors 12, or accidents due to opening thereof at the wrong time may be avoided and that my invention contributes to a considerable degree to the safety of the operator and passengers of motor cars.

What I claim is:

1. In a motor car including a movable ignition switch, an instrument panel, and side doors hinged at their rear edges and having forward free edges, bearing brackets secured to the forward under side of the instrument panel, a cross shaft mounted in the bearing brackets and having an intermediate crank arm and having crank arms at the opposite ends thereof, a lever movable with the switch and operatively connected to the intermediate crank arm to rotate the said shaft in accordance with movements of the switch, and door locking bolts pivoted to and movable with the end crank arms of the shaft, the said doors having sockets in their forward free edges to receive the extremities of said bolts.

2. A motor car including a steering column, an ignition switch carried by the column and having an oscillatory lever for moving it to "on" and "off" positions and hinged side doors having bolt sockets in the forward free edges thereof, locking bolts shiftable into and out of said sockets, and connections between said lever and bolts for shifting the said bolts in accordance with movements of the lever.

3. In a motor car, a steering column, hinged doors having their forward edges provided with sockets, locking bolts within the sides of the body of the car for engagement in said sockets for locking the doors in closed position, a shifting mechanism for said bolts arranged forwardly of said column, an ignition switch secured to the column, an oscillatory lever for placing said switch in "on" and "off" positions, and an actuating means for said mechanism connected to the latter and to said lever and having its movement controlled by said lever.

4. In a motor car, hinged doors having their forward edges provided with sockets, a shiftable door locking mechanism including bolts for engaging in said sockets for locking the doors, an ignition switch movable to "on" and "off" positions, an oscillatory lever for shifting the switch to "on" and "off" positions, an actuating means for said mechanism connected to the latter and to said lever and having its movement and the movement of said mechanism controlled by the lever, and said bolts coacting with said edges of the doors to prevent the shifting of said lever to move the switch to "on" position when the doors are not completely closed.

5. In a motor car, side doors hinged at their rear edges and having their forward edges provided with sockets, the sides of the car forwardly of said forward edges of the doors being formed with horizontal channels open at their rear ends and communicating at their forward ends with the interior of the car, locking bolts slidably mounted in said channels for engagement in said sockets to lock the doors in closed position, an oscillatory lever for moving an ignition switch to "on" and "off" positions, bolt shifting mechanism supported within the car and connected to said bolts for moving them to and from locking position, and actuating means for said mechanism connected to the latter and to said lever and having its movement and the movement of said mechanism controlled by said lever.

6. In a motor car, an actuatable ignition switch provided with a depending oscillatory lever for actuating it to "on" and "off" positions, a shiftable door locking mechanism, a steering column, said lever and ignition switch being mounted on said column and connections between said mechanism and said lever for shifting said mechanism to locking and unlocking positions on the movements of said lever to actuate the switch to "on" and "off" positions respectively.

7. In a motor vehicle, a door locking and releasing mechanism having its operation dependent upon the moving of an ignition to "on" and "off" positions, in combination, slidable locking bolts, doors of the vehicle having means for receiving said locking bolts to lock the doors closed, a shifting mechanism for moving said bolts to and from locking position, an ignition switch capable of being shifted to "on" and "off" positions, a lever for shifting the switch to "on" and "off" positions, a steering column, said lever and ignition switch being mounted on said column and connections between said lever and shifting mechanism for actuating the latter in opposite directions to slide the bolts to and from locking positions on the operation of the lever to position said switch in "on" and "off" positions respectively.

8. In a motor vehicle, an ignition switch, a door locking mechanism having its locking and releasing positions controlled by the "on" and "off" positions of said switch, a steering column, said lever and ignition switch being mounted on said column and a shiftable positioning means for setting the switch in its "on" and "off" positions, said means being connected to said mechanism for operating the latter in locking and releasing directions on the setting of said switch in "on" and "off" positions respectively.

9. In a motor car having a steering column, an ignition switch anchored to said column and being shiftable to close and open positions, side doors having forward free edges, a cross shaft disposed transversely of the car forwardly of said column and having an intermediate crank arm and crank arms at the ends thereof, a lever for opening and closing the switch, a link pivotally connecting the said lever with the intermediate crank arm of the shaft, and door locking bolts pivotally connected to and extending from the said end arms of the shaft, the said doors being provided with sockets in their free edges to receive the extremities of said bolts.

10. A motor car including a steering column, an ignition switch carried by said column and having an oscillatory lever for moving it to "on" and "off" positions, hinged doors having bolts sockets in the forward free edges thereof, locking bolts shiftable into and out of said sockets and aligned with said sockets when the doors are fully closed, and connections between said lever and bolts for shifting said bolts in accordance with movements of the switch and further acting to prevent movement of the lever to "on" position for the switch when one of the doors is in partly closed position.

WALTER B. SCOTT.